US011159029B2

(12) United States Patent
Keates (10) Patent No.: US 11,159,029 B2
(45) Date of Patent: Oct. 26, 2021

(54) BATTERY POWERED SYSTEM WITH INTERLEAVED DISCHARGE OF BATTERIES (71) Applicant: Intel Corporation, Santa Clara, CA (US)

(72) Inventor: Andrew Keates, Los Gatos, CA (US)

(73) Assignee: Intel Corporation, Santa Clara, CA (US)

( * ) Notice: Subject to any disclaimer, the term of this patent is extended or adjusted under 35 U.S.C. 154(b) by 1009 days.

(21) Appl. No.: 15/074,783

(22) Filed: Mar. 18, 2016

(65) Prior Publication Data

US 2017/0271891 A1  Sep. 21, 2017

(51) Int. Cl.
*H02J 7/00* (2006.01)
*H01M 10/44* (2006.01)

(52) U.S. Cl.
CPC ......... *H02J 7/0021* (2013.01); *H01M 10/441* (2013.01); *H02J 7/007* (2013.01); *H02J 7/0024* (2013.01); *H02J 7/0026* (2013.01); *H02J 7/0063* (2013.01); *H02J 2007/0067* (2013.01)

(58) Field of Classification Search
None
See application file for complete search history.

(56) References Cited

U.S. PATENT DOCUMENTS

| 5,808,445 | A | 9/1998 | Aylor et al. | |
|---|---|---|---|---|
| 6,346,794 | B1 * | 2/2002 | Odaohhara | H02J 7/0013 |
| | | | | 320/116 |
| 7,003,679 | B1 | 2/2006 | Lesea et al. | |
| 2001/0013767 | A1 | 8/2001 | Takemoto | |
| 2005/0083018 | A1 | 4/2005 | Morrow | |
| 2007/0188137 | A1 * | 8/2007 | Scheucher | B60L 50/64 |
| | | | | 320/116 |
| 2011/0057617 | A1 * | 3/2011 | Finberg | H02J 7/0016 |
| | | | | 320/118 |
| 2012/0109248 | A1 | 5/2012 | Danielsson et al. | |
| 2013/0033114 | A1 | 2/2013 | Lee et al. | |

(Continued)

FOREIGN PATENT DOCUMENTS

DE  102008040524 A1  1/2010
WO  2015068537 A1  5/2015

OTHER PUBLICATIONS

International Search Report and Written Opinion dated May 24, 2017 for International Application No. PCT/US2017/017404, 15 pages.

(Continued)

*Primary Examiner* — David V Henze-Gongola
(74) *Attorney, Agent, or Firm* — Schwabe, Williamson & Wyatt, P.C.

(57) ABSTRACT

Apparatuses, methods and storage medium associated with a battery powered system with interleaved discharge of batteries are disclosed herein. In embodiments, an apparatus may include one or more processors, devices, and/or circuitry to selectively couple a plurality of batteries to a voltage input node of a voltage regulation circuit to interleave discharge of the plurality of batteries to provide content circuit of a multimedia electronic device with an aggregated power consumed from the plurality of batteries, the aggregated power greater than a power corresponding to one of the batteries. Other embodiments may be described and/or claimed.

10 Claims, 7 Drawing Sheets

(56) References Cited

U.S. PATENT DOCUMENTS

2014/0217986 A1    8/2014  Skipper
2016/0291683 A1*  10/2016  Kacker ................ H02J 7/0013
2016/0294194 A1    10/2016  Miyamoto et al.

OTHER PUBLICATIONS

Extended European Search Report dated Aug. 7, 2019 for EP Application No. 17767123.7, 8 pages.
Office Action dated Apr. 8, 2020 for EP Application No. 17767123.7, 5 pages.

* cited by examiner

BATTERY POWERED SYSTEM WITH INTERLEAVED DISCHARGE OF BATTERIES

TECHNICAL FIELD

The present disclosure relates to powering portable multimedia electronic devices.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Advances in computing technology have led to proliferation of portable multimedia electronic devices. Typically, portable multimedia electronic devices include one original battery, which is sufficient to power the portable multimedia electronic device on its own. Often times, the portable multimedia electronic device may be upgraded with an additional battery, with the portable multimedia electronic device configured to utilize the original battery after discharging the additional battery.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Apparatuses, methods and storage medium associated with a battery powered system with interleaved discharge of batteries are disclosed herein. In embodiments, an apparatus may include one or more processors, devices, and/or circuitry to selectively couple a plurality of batteries to a voltage input node of a voltage regulation circuit to interleave discharge of the plurality of batteries to provide content circuit of a multimedia electronic device with an aggregated power consumed from the plurality of batteries, the aggregated power greater than a power corresponding to one of the batteries.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without parting from the spirit or scope of the present disclosure. It should be noted that like elements disclosed below are indicated by like reference numbers in the drawings.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "circuitry" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Current regulations limit a single battery pack to less than 100 Wh. However, an untethered virtual reality kit or other portable multimedia electronic device may have power demands that are significantly more than 100 W. For example, a CPU and graphics component to render high definition 3D graphics at a desirable frame rate may need more than 100 W. An untethered virtual reality kit may need at least 300 Wh to run for a reasonable amount of time.

Figure 1:
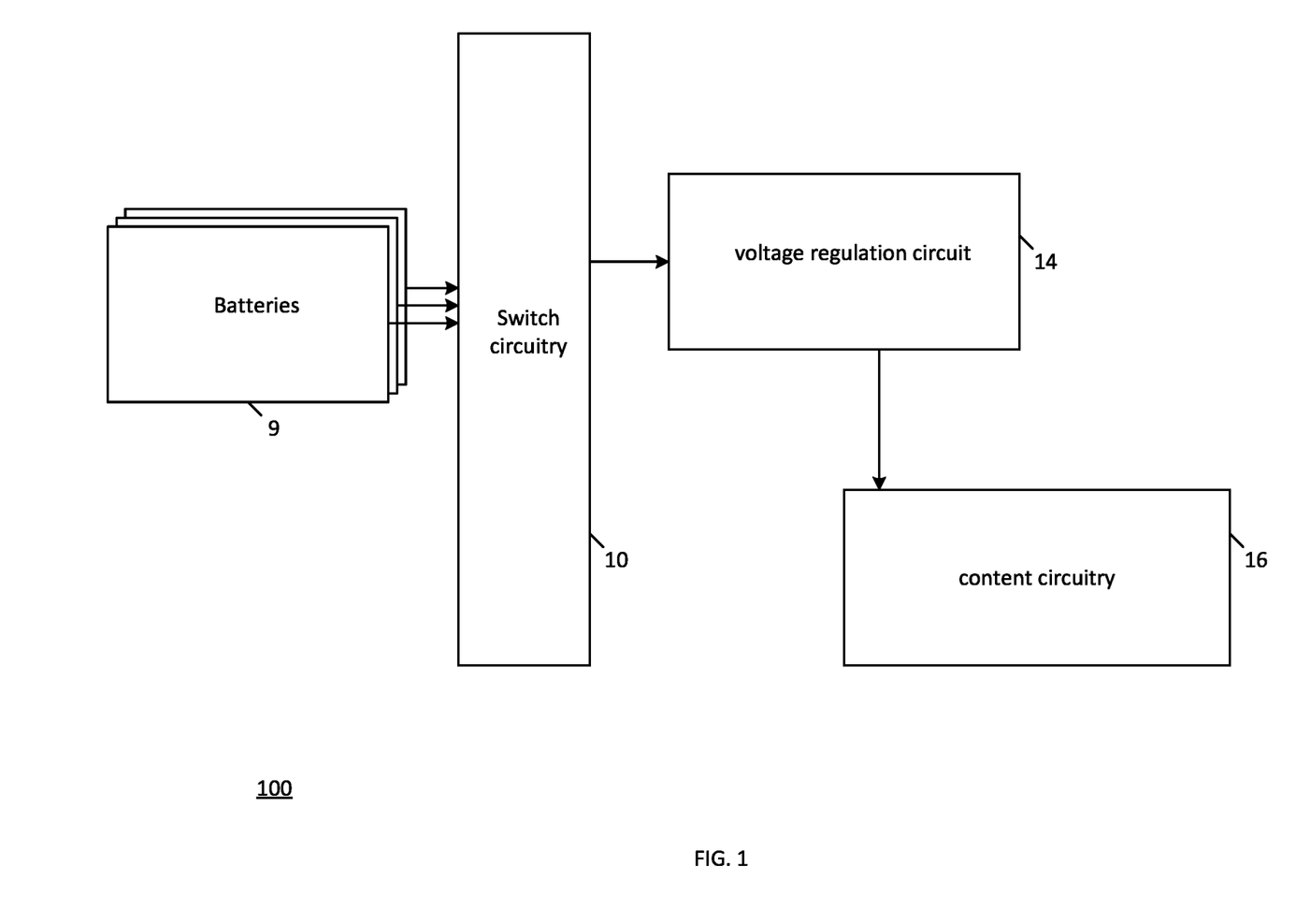
FIG. 1 is a simplified block diagram of at least one embodiment of a battery powered system with interleaved discharge of batteries, according to various embodiments.

FIG. 1 is a simplified block diagram of at least one embodiment of a battery powered system 100 with interleaved discharge of batteries, according to various embodiments. Referring now to FIG. 1, the system 100 may include switch circuitry 10 to selectively couple batteries 9 to a voltage input node of a voltage regulation circuit 14 to interleave discharge of the batteries 9 to provide a content circuit 16 with a first power that is different than a second power corresponding to one of the batteries 9. In some embodiments, the battery powered system 100 is a hot-swap battery powered system.

In some embodiments, the switch circuit 10 may include a multiplexor (not shown) and a control circuitry (not shown) to control the multiplexor. A voltage input node of the voltage regulation circuit 14 may be switched across the batteries 9 in round-robin format, to take power from each battery of batteries 9 in turn.

In some embodiments, the voltage regulation circuity 14 may include a boost convertor, a buck convertor, a boost-buck convertor, or the like, or combinations thereof (not shown). In some embodiments, the content circuit 10 may be of an untethered virtual reality kit or other portable multi-media electronic device, and in some embodiments may include a CPU component and a graphics component. In some embodiments, each battery of the batteries 9 may be of a different battery pack, e.g., a hot swappable battery pack, of battery packs.

In some embodiments, the switch circuitry 10 may include a discharge management component (not shown). The discharge management component may determine whether to increase or decrease a duration of a series of power pulses extracted from a given battery of batteries 9 in accordance with the state of charge of each individual battery of batteries 9 and/or calculate on-time for a transistor of the voltage regulation circuit 14 in accordance with the state of charge of each individual battery of batteries 9, or the like, or combinations thereof.

In an example, three fully charged batteries, e.g., three fully charged batteries having a similar electronic characteristics (e.g. s same power), are installed in battery powered system 100. The discharge management component may control a multiplexor or other switching component of switch circuitry 10 to cause each battery of batteries 9 to be connected to a voltage input node of a voltage regulation circuit 14. Each battery may be selectively coupled to the voltage input node for the same time duration, and an on-time at a transistor of the voltage regulation circuit 14 may be equal for all the batteries. The discharge management component may cause each battery of batteries 9 to be drained with a series of pulses over the same duration.

After some amount of operation of the system 100, a user may remove a first battery of batteries 9 while the second and third batteries of batteries 9 remain installed. The subset of remaining batteries may have equal charges, and the discharge management component may cause each battery of the subset to be selectively coupled to the voltage input node of voltage regulation circuit 14 for the same time duration, and an on-time at a transistor of the voltage regulation circuit 14 may be equal for all the batteries of the subset. The discharge management component may cause each battery of the subset to be drained with a series of pulses over the same duration.

Next a user may install a new fully charged battery, e.g., a battery of the same electrical characteristic as the third battery. The discharge management component may cause the batteries 9 including the new battery to be switched in turn, but may cause the new battery to be connected for a different amount of time than other batteries of batteries 9, which may cause the new battery to discharge at a different rate (e.g. a higher rate) than a rate of discharge of each other battery.

In some embodiments, the discharge management component may determine a charge of each installed battery of batteries 9, and select an amount of time for the new battery to be selectively coupled based on the determined state of charge of that battery. The discharge management component may select a time for connecting the new battery to cause all of the batteries to be exhausted all at once, or the discharge management component may select the time for connecting the new battery to cause a subset of the batteries to not be exhausted all at once. In some embodiments, the system 100 may include a programmable battery policy management setting (not shown). The switch circuitry 10 may be configured to determine a connection time for the first battery, wherein the determination is based on, e.g., based only on or based at least in part on, the policy management setting. In some examples, the battery management policies include a first battery management policy to exhaust the plurality of batteries 9 together and a second battery management policy of staggered exhaustion. The switch circuitry 10 may determine an equal connection time for fully charged batteries of the plurality of batteries 9 if the battery policy management setting corresponds to the first policy, and the switch circuitry 10 may determine unequal connection times for fully charged batteries of the plurality of batteries 9 if the battery policy management setting corresponds to the second policy.

In some embodiments, the switch circuitry 10 may include a charge estimation component (not shown) to establish a battery state-of-charge of an individual one of the batteries 9, and the discharge management component may determine the charge of the new battery via communications with the charge estimation component. Of course, in other examples, the discharge management component may determine a charge of the new battery using any known method for determining the charge of a battery and the switch circuitry 10 may or may not include a charge estimation component.

In another example, at least one of the batteries 9 may have a different electrical characteristic than other batteries of the batteries 9. For example, one of the batteries 9 may be a different size than another one of the batteries 9. The discharge management component may cause a larger battery to be connected for a different amount of time than each of the other batteries 9, which may cause the larger battery to discharge at a different rate (e.g., a higher rate) than a rate of discharge of each other battery.

In another example, the discharge management component may cause a targeted one battery of the batteries 9 to discharge down to a predetermined threshold, e.g., 10% of charge, ahead of the other batteries, to allow a user to hot swap the targeted batteries before the other batteries of the batteries 9 reach the threshold charge.

In an example, the switch circuitry 10 may determine a first ratio of charge to time period that is different than a second ratio of charge to time period to cause staggered battery exhaustion. In an example, the switch circuitry 10 may select a first time period associated with the selective coupling of a corresponding battery to coincide with the first ratio and the second time period associated with selective coupling of a corresponding battery to coincide with the second ratio.

Figure 2:
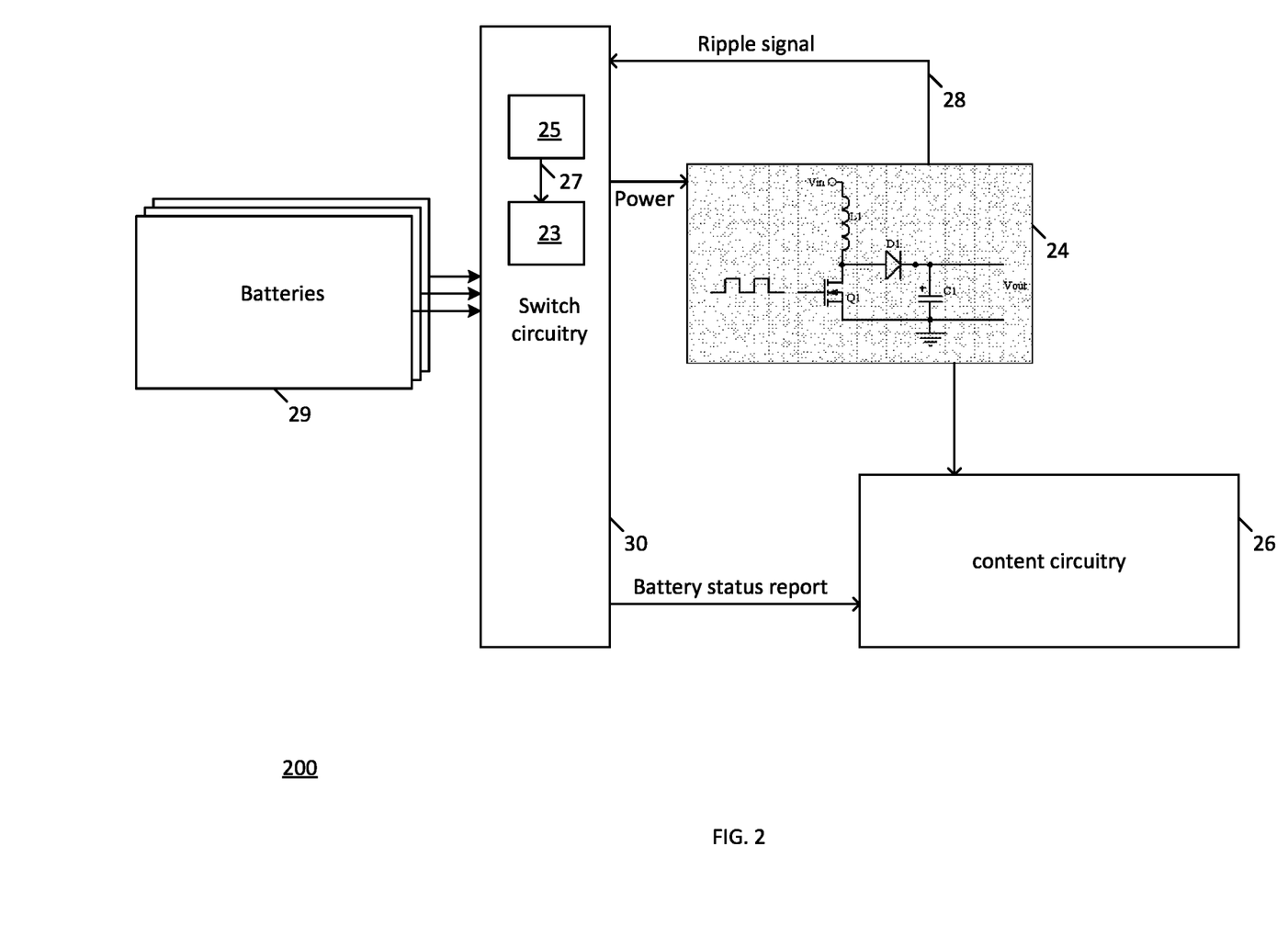
FIG. 2 is a simplified block diagram of another embodiment of a battery powered system including switch circuitry having a charge estimation module and a discharge management module, according to various embodiments.
Figure 4:
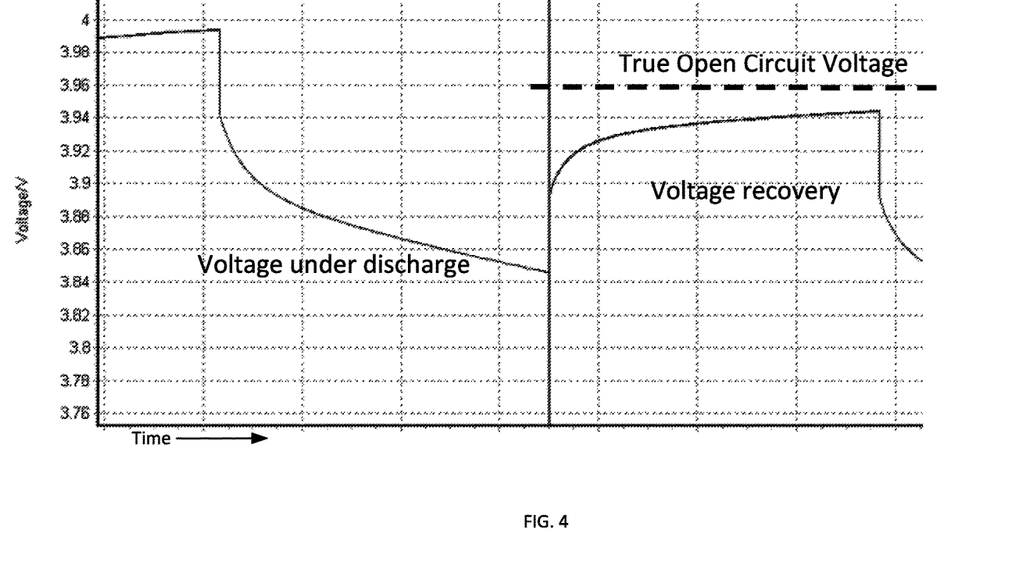
FIG. 4 illustrates a graph depicting voltage and time for a battery during and after discharging.
Figure 5:
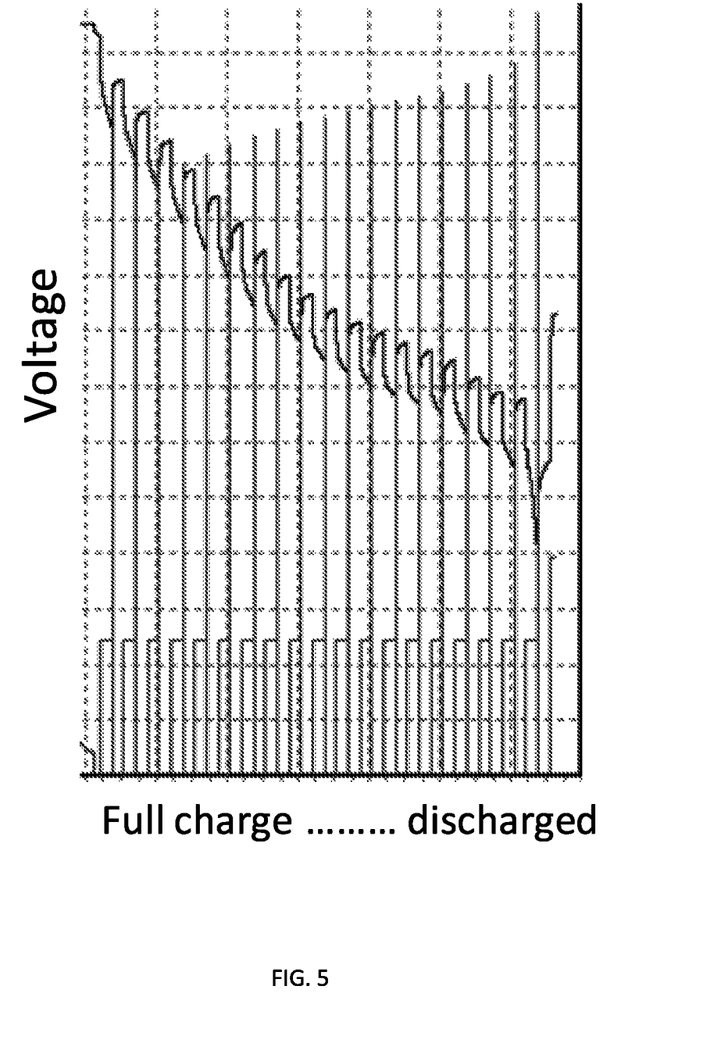
FIG. 5 illustrates another graph depicting voltage and time from full charge to empty.

FIG. 2 is a simplified block diagram of another embodiment of a battery powered system 200 including switch circuitry 30 having a charge estimation component (e.g. charge estimation module 25) and a discharge management component (e.g., discharge management module 23), according to various embodiments. The charge estimation module 25 may obtain an estimate of the state of charge of a battery (of batteries 29), which in embodiments, may be batteries having no in-battery gas gauge circuitry. For a battery with no in-battery gas gauge circuitry, the charge estimation module 25 may estimate the open-circuit voltage, and use this estimate as a proxy for the battery state of charge. The open-circuit voltage may be reduced while the battery is selectively coupled (e.g. providing power to the $V_{in}$ node), but may recover toward the open-circuit when the battery is not selectively coupled (e.g. not providing power). FIG. 4 illustrates a graph depicting voltage and time for a battery during and after discharging. The time axis in FIG. 4 is for a single turn of discharging, while FIG. 5 illustrates another graph depicting voltage and time ranging from full charge to empty (multiple turns of discharging).

Referring again to FIG. 2, in some examples, a battery may take a first time to return to close to the true open-circuit voltage, and the first time may be greater than a second time of selectively coupling the other batteries of batteries 29 of the battery powered system 100. For instance, the first time may be several minutes, and the second time may be significantly less than the first time. The charge estimation module 25 may estimate a final value of the open-circuit voltage by using a voltage measurement taken at a time of selective coupling of one of the other batteries of the batteries 29 by taking into account the rate at which the voltage is recovering. The charge estimate module 25 may signal 27 (based on the estimate) the discharge management module 23, which may select an amount of time for the new battery to be selectively coupled based on the determined charged indicated by the signal 27.

In some embodiments, the charge estimation module 25 may sample a voltage recovery curve on each battery of the batteries 29. The charge estimation module may read (not shown) a voltage signal from the battery that just finished discharging (this may be referred to as the "relaxing battery"). A time of sampling a given battery may correspond to a time the given battery is not selectively coupled to $V_{in}$ of voltage regulation circuit 24 (which is illustrated as a boost convertor for the purpose of explanation of one example and not to imply any limitation as to the configuration of the voltage regulation circuit 24). The switch circuitry 30 may determine whether to skip a turn of providing power for the given battery in order to measure an extended voltage recovery. The determination may be based on a quantity of the batteries 29, a ratio of the calculated on-time for the transistor Q1 of the voltage regulation circuit 24 to a total of the calculated on-times, a characteristic of the given battery, a user input indicating desired accuracy, or the like, or combinations thereof. In some cases, skipping turn(s) may provide significantly greater accuracy then performing the measurement without skipping any turns. The switch circuitry 30 may output a battery status report to the content circuitry 26 based on a result of the charge estimation.

In some embodiments, the charge estimation module 25 may analyze a ripple signal 28 associated with a ripple on output capacitor C1 of the voltage regulation circuit 24. The width of the switching pulses at transistor Q1 may be known. A battery at low state of charge will be operating at a lower voltage, and exhibit higher impedance. As a result, the battery will have a diminished ability to energize the inductor L of the voltage regulation circuit 24. A diminished energy level in inductor L1 may lead to a greater droop across capacitor C1 at a known current draw from $V_{out}$.

In some embodiments, switch circuitry 30 may obtain state of charge information for a "dumb" battery of batteries 29, e.g. a non-smart battery, e.g., a battery without gas gauge circuitry, and provide that information to content circuitry 26 for output to a user and/or for determining a power state of a component of the content circuitry 26. Dumb batteries may be used for multi-pack systems including multipack untethered virtual reality kits with a managed discharge scheme. Hot-swapping may be facilitated, with system policies to manage power drawn from the subset of batteries remaining after removal of a battery. Batteries 29 with unequal states of charge can be combined to contribute their combined power to the content circuitry 26. Battery drain can be managed to sustain high power from a number of battery packs, while discharging them to become exhausted at about the same time, or managing one to discharge first, so that the others can still sustain high power while the discharged one is hot-swapped out.

Figure 3:
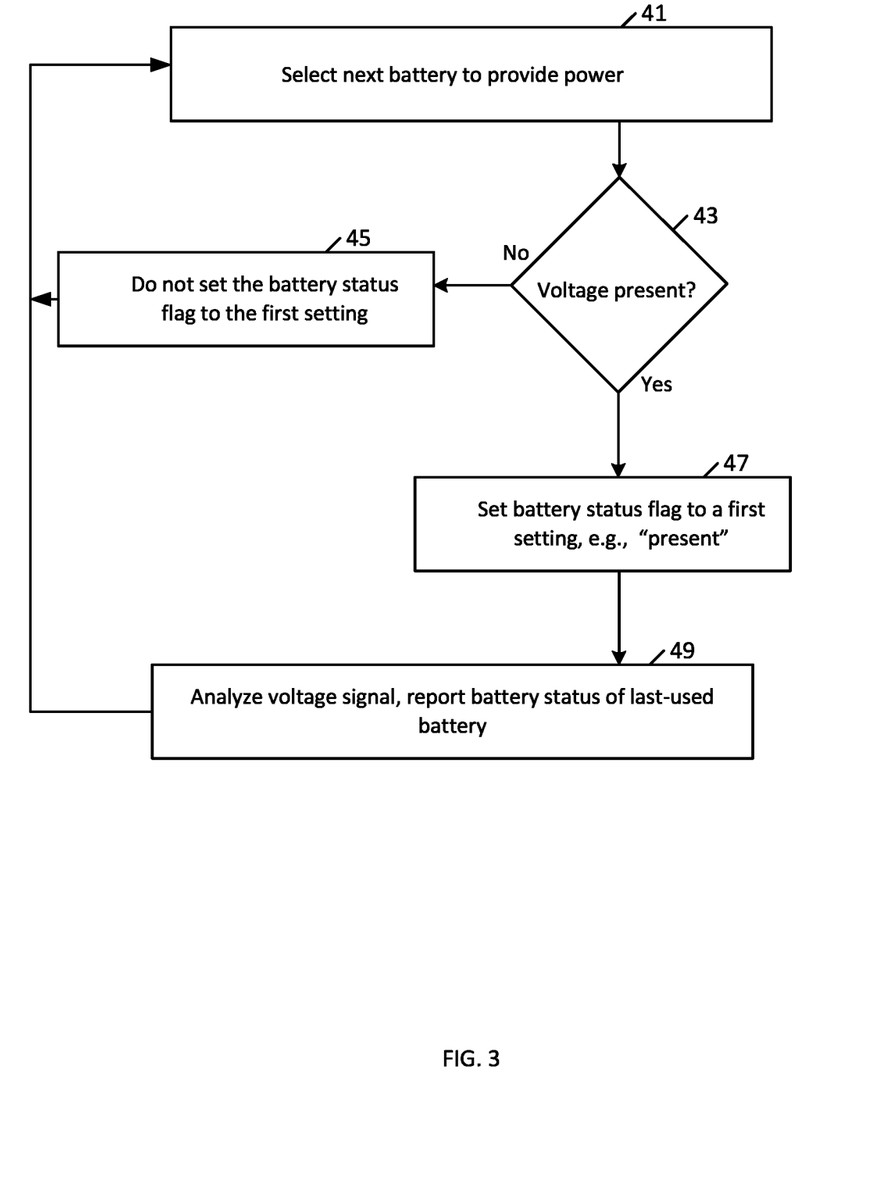
FIG. 3 is a simplified flow diagram of a method for interleaved discharge of batteries that may be executed by the system of FIG. 2, according to various embodiments.

FIG. 3 is a simplified flow diagram of another method for interleaved discharge of batteries that may be executed by the system of FIG. 2, according to various embodiments.

In block 41, the switch circuitry 30 may select the next battery to provide power. The next battery may be a next battery (N) in a sequence, e.g., a logical sequence of batteries.

If a voltage is present in diamond 43, then in block 47 the switch circuitry 30 may set a battery status indicator to a first setting, e.g., "present". In block 49, the switch circuitry 30 may analyze a voltage signal, and report battery status of last-used battery. The last-used battery may be a previous battery (N-1) in the logical sequence, e.g., a battery most recently selectively coupled to the switch circuitry 30.

It should be appreciated that a physical sequence of battery slots may include a number of batteries slots. The logical sequence of batteries to be each selectively coupled to the switch circuitry 30 in turn may include batteries corresponding to only a subset of the battery slots (for instance, including, but not limited to, if at least one battery is not installed). Also, it should be appreciated that an order of the logical sequence of batteries need not correspond to an order of the physical sequence of battery slots.

If a voltage was not present in diamond 43, then in block 45 the switch circuitry 30 may not set the battery status indicator to the first setting. The battery status flag may be set to a different second different setting, e.g., "absent".

In some embodiments, the method may include setting or unsetting a battery status indicator, such as a flag, for each of the batteries to indicate if the battery is present or not. The indicator may be set or reset based on analysis of the voltage signal in block 49 and/or determining whether a voltage is present on the corresponding battery in diamond 43.

Figure 6:
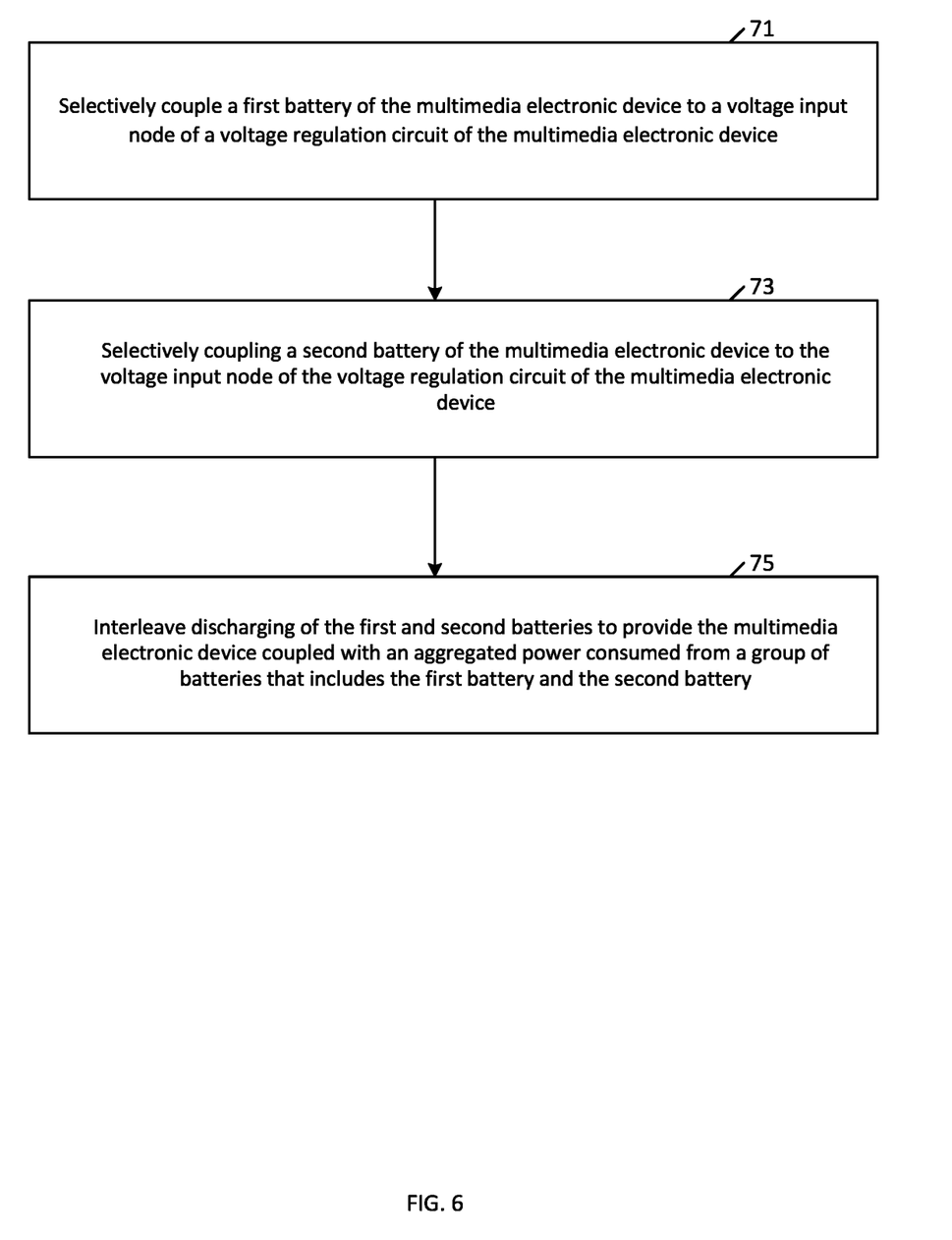
FIG. 6 is a simplified flow diagram of managing power provision in a multimedia electronic device that may be executed by any of the systems described herein, according to various embodiments.

FIG. 6 is a simplified flow diagram of managing power provision in a multimedia electronic device that may be executed by any of the systems described herein, according to various embodiments.

In block 71, the system may selectively couple a first battery of the multimedia electronic device to a voltage input node of a voltage regulation circuit of the multimedia electronic device. In block 73, the system may selectively couple a second battery of the multimedia electronic device to the voltage input node of the voltage regulation circuit of the multimedia electronic device. In block 75, the system may interleave discharging of the first and second batteries to provide the multimedia electronic device coupled to an output node of the voltage regulation circuit with an aggregated power consumed from a group of batteries that includes the first battery and the second battery. The aggregated power may be different than, e.g., greater than, a power corresponding to one of the batteries. In an example, an untethered virtual reality kit may (at a given point in time) require power in the hundreds of watts, which may be aggregated by discharging in tandem by more than one 100 Wh battery.

In some examples, the system may select a first time period associated with the selective coupling of the first battery based on an estimated charge of the first battery. The system may select a second time period associated with the selectively coupling of the second battery based on an estimated charge of the second battery. The first time period may be different than the second time period. The estimated charge of the first battery is equal to the estimated charge of the second battery.

In some examples, the system may determine whether to cause a staggered exhaustion of the first and second batteries. In response to determining to cause the staggered exhaustion, the system may determine a first ratio of charge to time period that is different than a second ratio of charge to time period. The system may select the first time period to coincide with the first ratio and the second time period to coincide with the second ratio.

In an example, a multimedia electronic device, such as an untethered virtual reality kit including a vest for installation of three or more batteries, e.g., hot-swappable batteries, may be provided and a virtual reality headset powered by the vest, may be provided. The multimedia electronic device may include content circuitry to provide multimedia content, a voltage regulation circuit including a voltage output node to couple to the content circuitry, and a voltage input node, and switch circuity to selectively couple a plurality of batteries to the voltage input node to interleave discharge of the plurality of batteries to provide the content circuit with an aggregated power consumed from the plurality of batteries, the aggregated power greater than a power corresponding to one of the batteries.

In an example, at least a first of the plurality of batteries is void of in-battery gas gauge circuitry, and the switch circuitry may include a charge estimation component to establish a battery state-of-charge of the first battery, the charge estimation component to sample a voltage recovery curve for the first battery or analyze a ripple on an output capacitor of the voltage regulation circuit, and ascertain a battery state for the first battery based on at least one of the sampled voltage recovery curve or the ripple analysis.

In an example, the switch circuitry may determine a connection time for the first battery, wherein the determination is based on a result of the ascertainment, and switch a transistor of the voltage regulation circuit based on the determined connection time.

In an example, the switch circuitry may access a programmable battery policy management setting, and determine the connection time based on a value of the programmable battery policy management setting and a result of the ascertainment.

In an example, the switch circuitry may identify one of a plurality of battery management policies that includes at least a first battery management policy to exhaust the plurality of batteries together and a second battery management policy of staggered exhaustion, determine an equal connection time for fully charged batteries of the plurality of batteries in response to identification of the first battery management policy, and determine unequal connection times for fully charged batteries of the plurality of batteries in response to identification the second battery management policy.

In an example, at least a first of the plurality of batteries is void of in-battery gas gauge circuitry, and the switch circuitry may include a charge estimation component to establish a battery state-of-charge of the first battery, the charge estimation component to, at a time that the first battery is selectively coupled to the voltage input node of the voltage regulation circuit, estimate an open-circuit voltage of a selectively non-coupled second battery of the plurality of batteries, and determine a battery state for the non-coupled second battery based on the open-circuit voltage estimate.

In an example, the charge estimation component may measure a voltage corresponding to the selectively non-coupled second battery, and may estimate the open-circuit voltage with the measured voltage and a voltage recovery rate.

In an example, the switch circuitry may sample a voltage recovery curve for each of the batteries, and determine the voltage recovery rate for the selectively non-coupled second battery with a respective one of the voltage recovery curve samples.

In an example, the switch circuitry may power the content circuitry with only a subset of the plurality of batteries for a time period, and during the time period, sample the voltage recovery curve for one of the batteries that is not of the subset.

In an example, a computer-readable medium having stored thereon instructions may be provided. In response to execution by a processor of a multimedia electronic device, the instructions may cause the multimedia electronic device to perform operations for implementing a battery management policy on a hot-swap battery powered system of the multimedia electronic device having a plurality of batteries without gas gauge. The operations may be operable to cause a voltage recovery curve of a first of the batteries of the multimedia electronic device to be sampled or analyze a ripple corresponding to an output capacitor of a voltage regulation circuit selectively coupled to the first battery, the voltage regulation circuit of the multimedia electronic device, and to ascertain a battery state of the first battery based on at least one of the sampled voltage recovery curve or the ripple analysis.

In an example, the operations may be operable to determine a connection time for the first battery to power the multimedia electronic device, wherein the determination is based on a result of the ascertainment, and switch a transistor of the voltage regulation circuit based on the determined connection time.

In an example, the operations may be operable to access a programmable battery policy management setting, determine the connection time based on a value of the programmable battery policy management setting and a result of the ascertainment.

In an example, the operations may be operable to, at a time that the first battery is selectively coupled to a voltage input node of the voltage regulation circuit, estimate an open-circuit voltage of selectively non-coupled second battery of the plurality of batteries, and determine a battery state based on the open-circuit voltage estimate.

In an example, the operations may be operable to measure a voltage corresponding to the selectively non-coupled second battery, and estimate the open-circuit voltage using the measured voltage and a voltage recovery rate.

Figure 7:
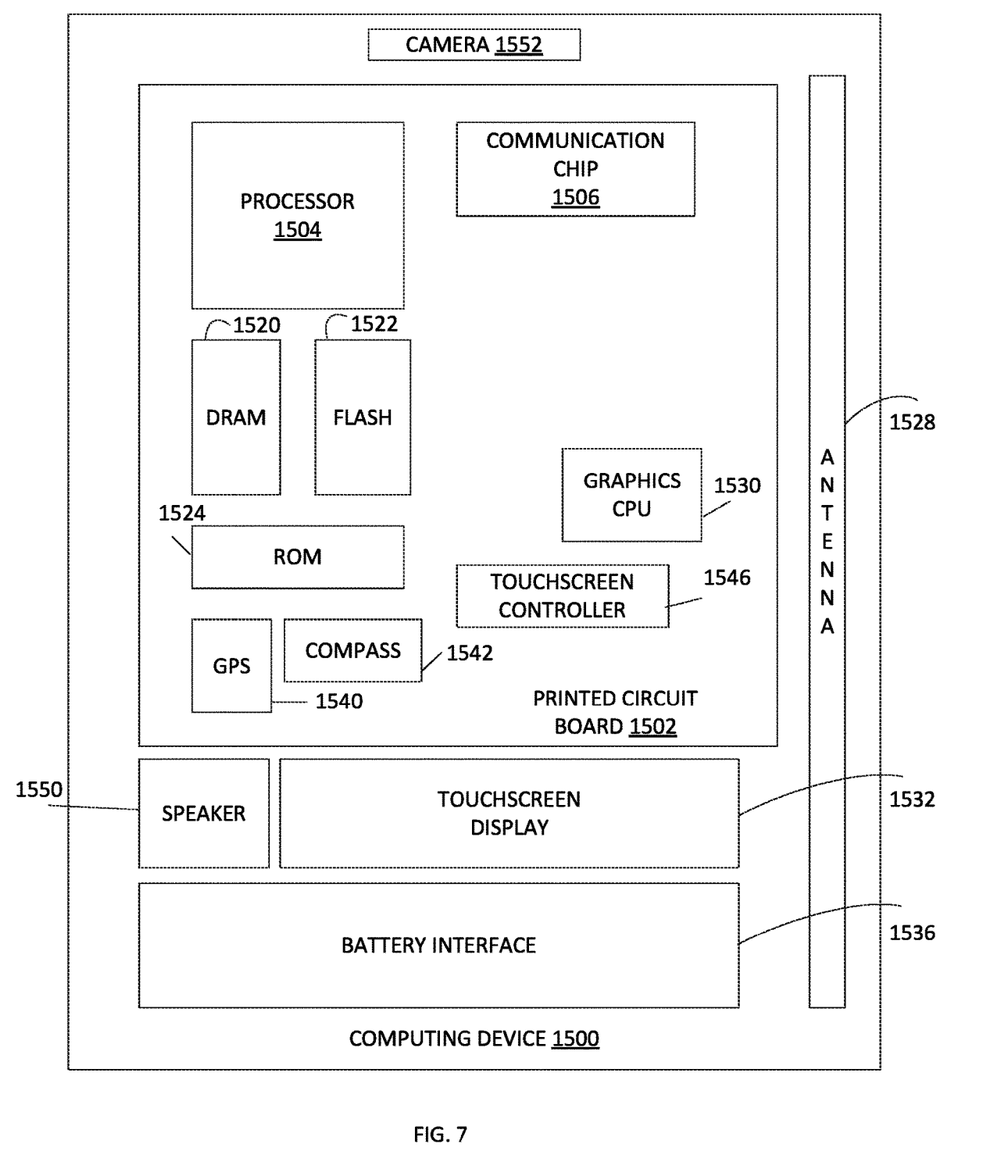
FIG. 7 illustrates an example computing device that may employ the apparatuses and/or methods described herein, according to various embodiments.

FIG. 7 illustrates an example computing device that may employ the apparatuses and/or methods described herein, according to various embodiments. As shown, computing device 1500 may include a number of components, such as battery interface 1536 (e.g., a battery housing, a battery connector, or the like, or combinations thereof) for removably receiving a plurality of batteries (e.g., a plurality of battery packs). The battery interface 1536 may be coupled to circuitry (not shown), which may include any of the switch circuitry described anywhere herein, or a circuitry to implement a component/module thereof. The circuitry may also include a voltage regulation circuit, such as a boost convertor, a buck convertor, a boost-buck convertor, or the like. The circuitry may selectively couple a plurality of batteries removably received at battery interface 1536 to a voltage input node of the voltage regulation circuit to interleave discharge of the plurality of batteries to provide content circuitry (not shown) of the circuit with an aggregated power consumed from the plurality of batteries. The aggregated power may be different than, e.g., greater than, a power corresponding to one of the batteries.

In some embodiments, circuitry of the computing device may include content circuitry and selection circuitry, which may include one or more processor(s) 1504 and the at least one communication chip 1506, which may be physically and electrically coupled to the one or more processor(s) 1504. In further implementations, the communication chip 1506 may be part of the one or more processor(s) 1504. In various embodiments, computing device 100 may include printed circuit board (PCB) 1502. For these embodiments, the one or more processor(s) 1504 and communication chip 1506 may be disposed thereon. In alternate embodiments, the various components may be coupled without the employment of PCB 1502.

Depending on its applications, computing device 1500 may include other components that may or may not be physically and electrically coupled to the PCB 1502. These other components include, but are not limited to, a memory controller (not shown), volatile memory (e.g., dynamic random access memory (DRAM) 1520), non-volatile memory such as read only memory (ROM) 1524, flash memory 1522, an I/O controller (not shown), a digital signal processor (not shown), a crypto processor (not shown), a graphics processor 1530, one or more antenna 1528, a display (not shown), a touch screen display 1532, a touch screen controller 546, an audio codec (not shown), a video codec (not shown), a global positioning system (GPS) device 1540, a compass 1542, an accelerometer (not shown), a gyroscope (not shown), a speaker 1550, a camera 1552, and a mass storage device (such as hard disk drive, a solid state drive, compact disk (CD), digital versatile disk (DVD)) (not shown), and so forth.

In some embodiments, the one or more processor(s) 1504, flash memory 1522, and/or a storage device (not shown) may include associated firmware (not shown) storing programming instructions configured to enable computing device 1500, in response to execution of the programming instructions by one or more processor(s) 1504, to practice all or selected aspects of the methods described herein. For example, the programming instructions may implement the earlier described modules with references to the respective figures of FIGS. 1-3. In various embodiments, these aspects may additionally or alternatively be implemented using hardware separate from the one or more processor(s) 1504, flash memory 1512, or storage device 1511.

The communication chips 1506 may enable wired and/or wireless communications for the transfer of data to and from the computing device 1500. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 506 may implement any of a number of wireless standards or protocols, including but not limited to IEEE 702.20, Long Term Evolution (LTE), LTE Advanced (LTE-A), General Packet Radio Service (GPRS), Evolution Data Optimized (Ev-DO), Evolved High Speed Packet Access (HSPA+), Evolved High Speed Downlink Packet Access (HSDPA+), Evolved High Speed Uplink Packet Access (HSUPA+), Global System for Mobile Communications (GSM), Enhanced Data rates for GSM Evolution (EDGE), Code Division Multiple Access (CDMA), Time Division Multiple Access (TDMA), Digital Enhanced Cordless Telecommunications (DECT), Worldwide Interoperability for Microwave Access (WiMAX), Bluetooth, derivatives thereof, as well as any other wireless protocols that are designated as 3G, 5G, 5G, and beyond. The computing device 1500 may include a plurality of communication chips 1506. For instance, a first communication chip 1506 may be dedicated to shorter range wireless communications such as Wi-Fi and Bluetooth, and a second communication chip 506 may be dedicated to longer range wireless communications such as GPS, EDGE, GPRS, CDMA, WiMAX, LTE, Ev-DO, and others (e.g., developed or yet to be developed).

In various implementations, the computing device 1500 may be an untethered virtual reality kit, a laptop, a netbook, a notebook, an ultrabook, a smartphone, a computing tablet, a personal digital assistant (PDA), an ultra-mobile PC, a mobile phone, a desktop computer, a server, a printer, a scanner, a monitor, a set-top box, an entertainment control unit (e.g., a gaming console or automotive entertainment unit), a digital camera, an appliance, a portable music player, a digital video recorder, or the like, or combinations thereof. In further implementations, the computing device 1500 may be any other electronic device that processes data.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

EXAMPLES

Example 1 is a method of managing power provision in a multimedia electronic device, the method comprising selectively coupling a first battery of the multimedia electronic device to a voltage input node of a voltage regulation circuit of the multimedia electronic device; selectively coupling a second battery of the multimedia electronic device to the voltage input node of the voltage regulation circuit of the multimedia electronic device; and interleaving discharging of the first and second batteries to provide the multimedia electronic device coupled to an output node of the voltage regulation circuit with an aggregated power consumed from a group of batteries that includes the first battery and the second battery, the aggregated power greater than a power corresponding to one of the batteries.

Example 2 includes the subject matter of example 1, further comprising selecting a first time period associated with the selective coupling of the first battery based on an estimated charge of the first battery; and selecting a second time period associated with the selectively coupling of the second battery based on an estimated charge of the second battery.

Example 3 includes the subject matter of any of examples 1-2, and the first time period is different than the second time period.

Example 4 includes the subject matter of any of examples 1-3, and the estimated charge of the first battery is equal to the estimated charge of the second battery.

Example 5 includes the subject matter of any of examples 1-4, and further comprises determining whether to cause a staggered exhaustion of the first and second batteries; in response to determining to cause the staggered exhaustion, determining a first ratio of charge to time period that is different than a second ratio of charge to time period; and selecting the first time period to coincide with the first ratio and the second time period to coincide with the second ratio.

Example 6 is a computer-readable medium having stored thereon instructions that, in response to execution by a processor of a multimedia electronic device, cause the multimedia electronic device to perform operations for implementing a battery management policy on a hot-swap battery powered system of the multimedia electronic device having a plurality of batteries without gas gauge, the operations to: cause a voltage recovery curve of a first of the batteries of the multimedia electronic device to be sampled or analyze a ripple corresponding to an output capacitor of a voltage regulation circuit selectively coupled to the first battery, the voltage regulation circuit of the multimedia electronic device; and ascertain a battery state of the first battery based on at least one of the sampled voltage recovery curve or the ripple analysis.

Example 7 includes the subject matter of example 6, and the operations to determine a connection time for the first battery to power the multimedia electronic device, wherein the determination is based on a result of the ascertainment; and switch a transistor of the voltage regulation circuit based on the determined connection time.

Example 8 includes the subject matter of any of examples 6-7, and the operations to: access a programmable battery policy management setting; and determine the connection time based on a value of the programmable battery policy management setting and a result of the ascertainment.

Example 9 includes the subject matter of any of examples 6-8, and the operations to: at a time that the first battery is selectively coupled to a voltage input node of the voltage regulation circuit, estimate an open-circuit voltage of selectively non-coupled second battery of the plurality of batteries; and determine a battery state based on the open-circuit voltage estimate.

Example 10 includes the subject matter of any of examples 6-9, and the operations to: measure a voltage corresponding to the selectively non-coupled second battery; and estimate the open-circuit voltage using the measured voltage and a voltage recovery rate.

Example 11 is a multimedia electronic device including content circuitry to provide multimedia content; a voltage regulation circuit including a voltage output node to couple to the content circuitry, and a voltage input note; and switch circuity to selectively couple a plurality of batteries to the voltage input node to interleave discharge of the plurality of batteries to provide the content circuit with an aggregated power consumed from the plurality of batteries, the aggregated power greater than a power corresponding to one of the batteries.

Example 12 includes the subject matter of example 11, and at least a first of the plurality of batteries is void of in-battery gas gauge circuitry, and wherein the switch circuitry includes a charge estimation component to establish a battery state-of-charge of the first battery, the charge estimation component to: sample a voltage recovery curve for the first battery or analyze a ripple on an output capacitor of the voltage regulation circuit; and ascertain a battery state for the first battery based on at least one of the sampled voltage recovery curve or the ripple analysis.

Example 13 includes the subject matter of any of examples 11-12, and the switch circuitry to: determine a connection time for the first battery, wherein the determination is based on a result of the ascertainment; and switch a transistor of the voltage regulation circuit based on the determined connection time.

Example 14 includes the subject matter of any of examples 11-13, and the switch circuitry to: access a programmable battery policy management setting; and determine the connection time based on a value of the programmable battery policy management setting and a result of the ascertainment.

Example 15 includes the subject matter of any of examples 11-14, and the switch circuitry to: identify one of a plurality of battery management policies that includes at least a first battery management policy to exhaust the plurality of batteries together and a second battery management policy of staggered exhaustion; and in response to identification of the first battery management policy, determine an equal connection time for fully charged batteries of the plurality of batteries; and in response to identification the second battery management policy, determine unequal connection times for fully charged batteries of the plurality of batteries.

Example 16 includes the subject matter of any of examples 11-15, and at least a first of the plurality of batteries is void of in-battery gas gauge circuitry, and wherein the switch circuitry includes a charge estimation component to establish a battery state-of-charge of the first battery, the charge estimation component to: at a time that the first battery is selectively coupled to the voltage input node of the voltage regulation circuit, estimate an open-circuit voltage of a selectively non-coupled second battery of the plurality of batteries; and determine a battery state for the non-coupled second battery based on the open-circuit voltage estimate.

Example 17 includes the subject matter of any of examples 11-16, and the charge estimation component to: measure a voltage corresponding to the selectively non-coupled second battery; and estimate the open-circuit voltage with the measured voltage and a voltage recovery rate.

Example 18 includes the subject matter of any of examples 11-17, and the switch circuitry to: sample a voltage recovery curve for each of the batteries; and determine the voltage recovery rate for the selectively non-coupled second battery with a respective one of the voltage recovery curve samples.

Example 19 includes the subject matter of any of examples 11-18, and the switch circuitry to: power the content circuitry with only a subset of the plurality of batteries for a time period; and during the time period, sample the voltage recovery curve for one of the batteries that is not of the subset.

Example 20 includes the subject matter of any of examples 11-19, and further comprising the switch circuitry to round-robin switch the voltage input node across the plurality of batteries.

Example 21 is an apparatus for operating a hot-swap battery powered system to provide power to a multimedia electronic device, including: means for selectively coupling a first battery and a second battery to a voltage input node of a voltage regulating circuit; and means for interleaving discharging of the plurality of batteries to provide the multimedia electronic device coupled to an output node of the voltage regulation circuit with an aggregated power consumed from the plurality of batteries, the aggregated power greater than a power corresponding to one of the batteries.

Example 22 includes the subject matter of example 21, and means for selecting a first time period associated with the selective coupling of the first battery based on an estimated charge of the first battery; and means for selecting a second time period associated with the selectively coupling of the second battery based on an estimated charge of the second battery.

Example 23 includes the subject matter of any of examples 21-22, and the first time period is different than the second time period.

Example 24 includes the subject matter of any of examples 21-23, and the estimated charge of the first battery is equal to the estimated charge of the second battery.

Example 25 includes the subject matter of any of examples 21-24, and means for determining whether to cause a staggered exhaustion of the first and second batteries; means for determining a first ratio of charge to time period that is different than a second ratio of charge to time period in response to determining to cause the staggered exhaustion; and means for selecting the first time period to coincide with the first ratio and the second time period to coincide with the second ratio.

Example 26 is a hot-swap battery powered system for managing power provision in a multimedia electronic device, the system comprising: a voltage regulation circuit including a voltage output node to couple to the multimedia electronic device, and a voltage input note; and circuity to selectively couple a plurality of batteries to the voltage input node to interleave discharge of the plurality of batteries to provide the multimedia electronic device with an aggregated power consumed from the plurality of batteries, the aggregated power greater than a power corresponding to one of the batteries.

Example 27 includes the subject matter of example 26, and at least a first of the plurality of batteries is void of in-battery gas gauge circuitry, and wherein the circuitry includes a charge estimation component to establish a battery state-of-charge of the first battery, the charge estimation component to: sample a voltage recovery curve for the first battery or analyze a ripple on an output capacitor of the voltage regulation circuit; and ascertain a battery state for the first battery based on at least one of the sampled voltage recovery curve or the ripple analysis.

Example 28 includes the subject matter of any of examples 26-27, and determine a connection time for the first battery, wherein the determination is based on a result of the ascertainment; and switch a transistor of the voltage regulation circuit based on the determined connection time.

Example 29 includes the subject matter of any of examples 26-28, and the circuitry to: access a programmable battery policy management setting; and determine the connection time based on a value of the programmable battery policy management setting and a result of the ascertainment.

Example 30 includes the subject matter of any of examples 26-229, and identify one of a plurality of battery management policies that includes at least a first battery management policy to exhaust the plurality of batteries together and a second battery management policy of staggered exhaustion; and in response to identification of the first battery management policy, determine an equal connection time for fully charged batteries of the plurality of batteries; and in response to identification the second battery management policy, determine unequal connection times for fully charged batteries of the plurality of batteries.

Example 31 includes the subject matter of any of examples 26-30, and at least a first of the plurality of batteries is void of in-battery gas gauge circuitry, and wherein the circuitry includes a charge estimation component to establish a battery state-of-charge of the first battery, the charge estimation component to: at a time that the first battery is selectively coupled to the voltage input node of the voltage regulation circuit, estimate an open-circuit voltage of a selectively non-coupled second battery of the plurality of batteries; and determine a battery state for the non-coupled second battery based on the open-circuit voltage estimate.

Example 32 includes the subject matter of any of examples 26-31, and the charge estimation component to: measure a voltage corresponding to the selectively non-coupled second battery; and estimate the open-circuit voltage with the measured voltage and a voltage recovery rate.

Example 33 includes the subject matter of any of examples 26-32, and the circuitry to: sample a voltage recovery curve for each of the batteries; and determine the voltage recovery rate for the selectively non-coupled second battery with a respective one of the voltage recovery curve samples.

Example 34 includes the subject matter of any of examples 26-33, and the circuitry to: power the multimedia electronic device with only a subset of the plurality of batteries for a time period; and during the time period, sample the voltage recovery curve for one of the batteries that is not of the subset.

Example 35 includes the subject matter of any of examples 26-34, and further comprising the circuitry to round-robin switch the voltage input node across the plurality of batteries.

What is claimed is:

1. A method, comprising:
   selectively coupling a first hot-swappable battery of a multimedia electronic device to a voltage input node of a voltage regulation circuit of the multimedia electronic device;
   selectively coupling a second hot-swappable battery of the multimedia electronic device to the voltage input node of the voltage regulation circuit of the multimedia electronic device;
   interleavingly discharging the first hot-swappable battery and the second hot-swappable battery by alternating the selective coupling of the first hot-swappable battery and the second hot-swappable battery to provide the multimedia electronic device coupled to an output node of the voltage regulation circuit with an aggregated power consumed from a group of hot-swappable batteries coupled to the voltage input node that includes the first hot-swappable battery and the second hot-swappable battery, the aggregated power greater than a power corresponding to one of the batteries;
   wherein interleavingly discharging is to cause exhaustion of the group of hot-swappable batteries at a same time; and
   wherein interleavingly discharging the first hot-swappable battery and the second hot-swappable battery is based on identifying a state of charge of the first hot-swappable battery or the second hot-swappable battery by analyzing a ripple corresponding to an output capacitor of a voltage regulation circuit selectively coupled to the first hot-swappable battery or the second hot-swappable battery.

2. The method of claim 1, wherein interleavingly discharging the first hot-swappable battery and the second hot-swappable battery is based on identifying a state of charge, respectively, of each battery of the group of batteries when the battery is not providing a power pulse.

3. A multimedia electronic device, comprising:
   content circuitry to provide multimedia content;
   a voltage regulation circuit including a voltage output node to couple to the content circuitry, and a voltage input node;
   switch circuitry to selectively couple a plurality of batteries to the voltage input node to interleavingly discharge the plurality of batteries to provide the content circuit with an aggregated power consumed from the plurality of batteries, the aggregated power greater than a power corresponding to one of the batteries, wherein, in a staggered exhaustion mode to cause one of the plurality of batteries to exhaust prior to one or more other batteries of the plurality of batteries, the switch circuitry is to:
      determine individual ratios of charge to time period for the respective batteries, wherein at least two of the ratios are different from one another; and
      determine individual connection times for which to couple the respective batteries to the voltage input node based on the respective individual ratio and a charge level of the respective battery; and
   wherein the switch circuitry includes a charge estimation component to establish the charge level of the first battery, the charge estimation component to:
      analyze a ripple corresponding to an output capacitor of a voltage regulation circuit coupled to the first battery; and
      ascertain the charge level for the first battery based on the analysis.

4. The multimedia electronic device of claim 3, wherein at least a first of the plurality of batteries is void of in-battery gas gauge circuitry.

5. The multimedia electronic device of claim 4, the switch circuitry to:
   switch a transistor of the voltage regulation circuit based on the determined connection time.

6. The multimedia electronic device of claim 5, wherein the switch circuitry is further operable in an equal exhaustion mode, and wherein the switch circuitry is to:
   in the equal exhaustion mode, determine an equal connection time for fully charged batteries of the plurality of batteries; and
   in the staggered exhaustion mode, determine unequal connection times for fully charged batteries of the plurality of batteries.

7. The multimedia electronic device of claim 3, wherein at least a first of the plurality of batteries is void of in-battery gas gauge circuitry, and wherein the switch circuitry includes a charge estimation component to establish a battery state-of-charge of the first battery, the charge estimation component to:
   at a time that the first battery is selectively coupled to the voltage input node of the voltage regulation circuit, estimate an open-circuit voltage of a selectively non-coupled second battery of the plurality of batteries; and
   determine the charge level for the non-coupled second battery based on the open-circuit voltage estimate.

8. The multimedia electronic device of claim 7, the charge estimation component to:
   measure a voltage corresponding to the selectively non-coupled second battery; and
   estimate the open-circuit voltage with the measured voltage and a voltage recovery rate.

9. The multimedia electronic device of claim 8, the switch circuitry to:
   analyze a ripple corresponding to an output capacitor of a voltage regulation circuit coupled respectively to each of the batteries; and
   ascertain a charge level for each of the batteries based on the analysis.

10. The multimedia electronic device of claim 3, wherein the switch circuitry is to round-robin switch the voltage input node across the plurality of batteries.

* * * * *